(12) United States Patent
Ghatta et al.

(10) Patent No.: US 7,048,981 B2
(45) Date of Patent: May 23, 2006

(54) TRANSPARENT POLYESTER RESINS AND ARTICLES THEREFROM

(75) Inventors: Hussain Al Ghatta, Fiuggi (IT); Sandro Cobror, Naples (IT)

(73) Assignee: Cobarr S.p.A., Anagni (IT)

( * ) Notice: Subject to any disclaimer, the term of this patent is extended or adjusted under 35 U.S.C. 154(b) by 0 days.

(21) Appl. No.: 10/490,905

(22) PCT Filed: Sep. 16, 2002

(86) PCT No.: PCT/EP02/10352

§ 371 (c)(1),
(2), (4) Date: Mar. 26, 2004

(87) PCT Pub. No.: WO03/029349

PCT Pub. Date: Apr. 10, 2003

(65) Prior Publication Data

US 2004/0242805 A1    Dec. 2, 2004

(30) Foreign Application Priority Data

Sep. 28, 2001  (IT) ........................... MI2001A2024
Nov. 16, 2001  (IT) ........................... MI2001A2425

(51) Int. Cl.
*C08L 77/00*    (2006.01)
*B29D 23/00*    (2006.01)

(52) U.S. Cl. ..................................... 428/55.7; 525/425
(58) Field of Classification Search ................ 525/425; 428/35.7
See application file for complete search history.

(56) References Cited

U.S. PATENT DOCUMENTS

| 6,239,210 B1 | 5/2001 | Kim et al. |
| 6,288,161 B1 | 9/2001 | Kim et al. |
| 6,346,307 B1 * | 2/2002 | Al Ghatta et al. ......... 428/35.7 |

\* cited by examiner

*Primary Examiner*—Ana Woodward
(74) *Attorney, Agent, or Firm*—Edwin A. Sisson; Alvin T. Rockhill

(57) ABSTRACT

Compositions suitable for preparing transparent articles comprising an aromatic polyester resin selected from a copolyalkylene terephthalate containing from 3 to 15% by moles of units derived from isophtalic acid and/or a naphtalene dicarboxylic acid and a polyxylylene amide, preferably poly (m.xylylene adipamide), in which the polymide is dispersed in the polyester resin as domains with average numeral size of 30 to 200 nm. The compositions are obtained by premelt-mixing the polyester with a dianhydride of a tetracarboxylic acid prior mixing the polyxylylene amide using melt viscosity ration between the polyester resin and the polyxylylene amide higher that 1.5:1, preferably from 3:1 to 8:1.

23 Claims, 2 Drawing Sheets

TRANSPARENT POLYESTER RESINS AND ARTICLES THEREFROM

The present invention relates to compositions comprising an aromatic polyester resin and a polyxylylene amide having improved transparency characteristics and to the articles, in particular films and beverage containers, produced therefrom.

Particularly, the invention relates to blends of polyester resins selected from polyalkylene terephthalates and copolyalkylene terephthalates containing monomeric units derived from isophthalic acid and/or naphthalene dicarboxylic acids, with poly (m.xylylene adipamide) (poly-MXD-6).

TECHNICAL BACKGROUND

Aromatic polyester resins have excellent mechanical properties; however, their barrier properties to gases such as $CO_2$ and oxygen are not sufficiently high. The barrier properties can be improved by mixing the polyester resin, in the molten state, with a polyxylylene amide, particularly poly-MXD-6, used in quantity of about 5 to 30% by weight.

The barrier properties with respect to oxygen and $CO_2$ are further increased if the composition comprising the polyester resin and the polyxylylene amide is prepared by premixing the polyester resin, in the molten state, with a dianhydride of a tetracarboxylic acid, particularly pyromellitic dianhydride (PMDA), and subsequently adding and mixing the polyamide with the molten polyester resin (EP-A-964031).

The addition of the polyxylylene amide either to the polyester resin premixed with the dianhydride or not containing the dianhydride, has the effect of reducing the transparency of the obtained articles.

The reduction in trasparency increases with the increase of the quantity of polyamide and of its molecular weight (WO-A-93/20147). Average numeral molecular weights of less than 15000 and amounts of polyamide less than 2 wt % are needed to limit the increase of opacity.

A need therefore exists of. providing polyester resins added with significant quantities of polyxylylene amide, which combine satisfactory barrier properties to oxygen and $CO_2$ with high transparency and colour characteristics.

DESCRIPTION OF THE INVENTION

It has unexpectedly been found that it is possible to improve the transparency and colour characteristics of aromatic polyester resins containing a polyxylylene amide in quantity from 1 to 30 wt % relative to the polyester resin, if the polyamide is dispersed in the polyester matrix in domains having average numeral size from 30 to 200 nm. The above fine dispersion is obtained by melt-mixing the polyester premixed with a dianydride of a tetracarboxylic acid with the polyamide, provided that the polyester is a copolyalkylene terephthalate (COPET) containing from 3 to 15% by mols or more of isophthalic acid units and/or naphthalene dicarboxylic acid units, and that the melt viscosity ratio between the copolyalkylene terephthalate and the polyamide is higher than 1.5:1.

The preferred polyamide is poly-MXD-6 which is preferably used in amounts of 1 to 15 wt % relative to the polyester resin.

Poly-MXD-6 in which all or part of the units derived from adipic acid are replaced by units deriving from dicarboxylic acids with 6–22 carbon atoms other than adipic acid, such as for example suberic, azelaic and dodecanoic acids may also be used.

The mixing of the polyester resin, (pre melt-mixed with the dianhydride), and the polyxylylene amide is carried out in extruder under conditions of temperature and shear forces such as to ensure a fine and stable dispersion of the polyamide in the polyester matrix. Preferably, the extruded pellets are reextruded.

Shear rates higher than 100 $s^{-1}$ are used when meltmixing the polyamide.

The melt viscosity ratio of the polyester to the polyamide, evaluated at 280° C. and at shear rate of 100 $s^{-1}$, preferably is from 3:1 to 8:1.

The domains of the polyxylilene amide dispersed in the polyester matrix, preferably poly MXD-6, have an average numeral size generally less than 100 nm (SEM determination on cast-film).

The distribution of the polyxylilene amide domains is such that more than 80% of the same have size from 80 to 110 nm and average numeral size fro 80 to 100 nm. Since the dispersed domains are substantially spheriform, the size is referred to the diameter.

The average numeral molecular weight of the polyxylylene amide preferably is lower that 16000.

The relative viscosity conveniently ranges from 1.8 to 2.2. Polyxylilene amides with crystallization rates similar to that of the polyester resin are preferred.

Concentrates in polyester of poly MXD-6 containing from 10 to 30% by weight of the.polyamide can also be used.

Dianhydride of the aromatic tetracarboxylic acids are preferred; pyromellitic dianhydride (PMDA) is the preferred dianhydride. The dianhydride of 2,2 bis-(2,4 dicarboxy) ether and of 3,3',4,4'-benzophenone tetracarboxylic acid are:examples of other suitable aromatic anhydrides.

The dianhidrides are used in quantity from 0.01 to 3%, preferably 0.01 to 0.4% by weight relative to the polyester resin.

The aromatic polyester resins are produced according to known methods by polycondensation of an aromatic dicarboxylic acid, or by transestenrification of the lower dialkyl esters of said acids, with a diol with 2–12 carbon atoms.

Ethylene terephthalate copolymers containing from 3 to 7% by mols of units derived from isophthalic acid and/or a-naphthalene dicarboxylic acid, particularly 2,6-naphthalene dicarboxylic acid, are preferred.

The intrinsic viscosity of the COPET resin is preferably comprised from 0.6 to 0.9 dl/g.

The haze of a cast film 0.5 mm thick is not higher than 3%, generally is 1–2%. The color parameter of the pellets is from 0.56 to 3.57.

The compositions are usable in many applications, in particular for the preparation of transparent and having gas barrier properties films bioriented or not obtained by cast extrusion or by blowing using the single-bubble or the double-bubble technique or by the tenter-frame technique and beverage bottles produced by injection stretch blowmolding.

Analytical Measurements

The intrinsic viscosity of the polyester resin has been determined in solution (approximately 0.5 g of resin) in a 60/40 by weight mixture of phenol and 2,2-tetrachloroethane at 25° C., in accordance with ASTM 4603-86.

The relative viscosity of the polyxylylene amide was determined at 25° C. in a solution of 1 g polyamide in 100 ml sufphuric acid at a concentration of 96 wt %.

The melt viscosity of the resins was determined at 280° C. at a shear rate of 100 sec$^{-1}$.

The haze measurement was determined according to ASTM D 1300.

The following examples are provided by way of non-limiting illustration of the invention.

The poly MXD6 used in the examples belonging to the invention was prepared by melt-polycondensation according to known methods. The polyamide was dried prior being fed into the extruder.

COMPARISON EXAMPLE 1

Copolyethylene terephthalate (COPET) containing 2.2% by weight of units from isophthalic acid and mixed in the molten state in extruder with 0.1% by wight of PMDA was mixed in extruder with 10% by weight of commercial MXD-6 grade 6007, commercialized by Mitsubishi Gas having relative viscosity of 2.7.

The melt viscosity ratio between COPET and MXD6 was 1.25:1.

The extrusion ,conditions were: cylinder temperature 280° C., extrusion-head temperature 275° C. The used extruder was an intermeshing twin extruder with diameter of the screws of 30 cm and L/D of 20; the rate of extrusion was 10 kg/h.

The chips produced had a b* colour parameter of 0.88.

The chips were crystallized at 140° C. in a stream of nitrogen and then extruded to form a cast film 100 mm wide and 0.5 mm thick (cylinder temperature 280° C., temperature of 275° C. at the extrusion flat-head).

Figure 1:
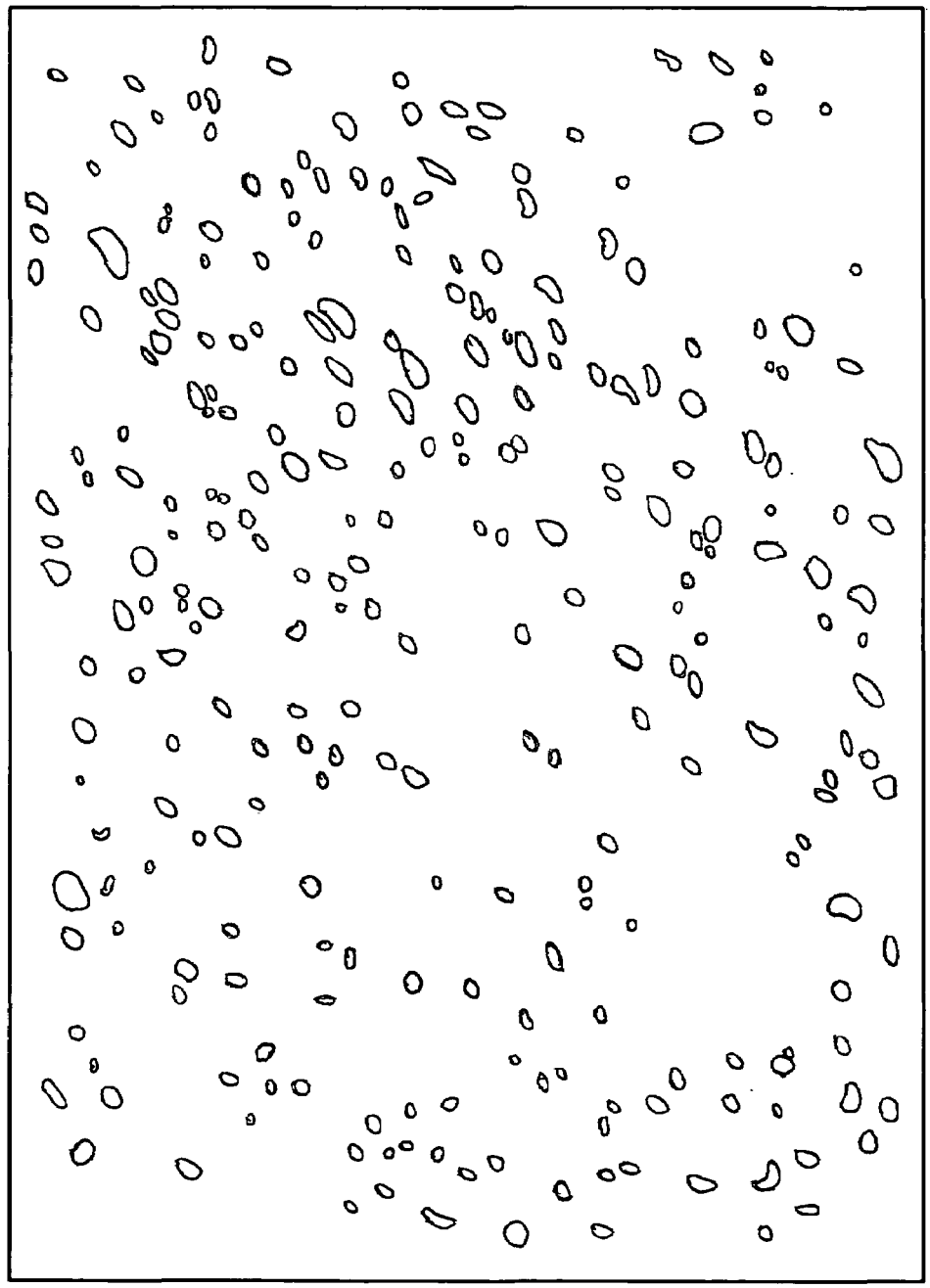
FIG. 1 depicts a graphic drawing a the Scanning Electron Micrograph (SEM) photograph of polyamide domains dispersed into polyester matrix.

The haze of the film produced was 4%; the SEM photograph showed that MXD6 was. dispersed in domains having average, numeral size of 220 nm (FIG. 1 reproduces in graphic form the size and the distribution of the dispersed MXD6 particles shown in the photograph).

COMPARISON EXAMPLE 2

Comparison example 1 was repeated with the only difference that the COPET contained 5% of isophthalic unis. The I.V. was 0.76 dl/g.

The melt viscosity ratio between COPET and MXD6 was 1.1:1. The haze of the cast film was 3.5%

EXAMPLE 1

Comparison Example 1 was repeated with the only difference that was used a poly MXD6 having relative viscosity of 2.1. The melt viscosity ratio of PET to MXD6 was 4:1.

The haze value of the cast film was 2.3%. The polyamide resulted to be dispersed in the polyester matrix in spheriform domains of 100 nm of average diameter (SEM determination on the the fracture surface of a small bar obtained by injection molding and treated with formic acid to extract the polyamide).

Figure 2:
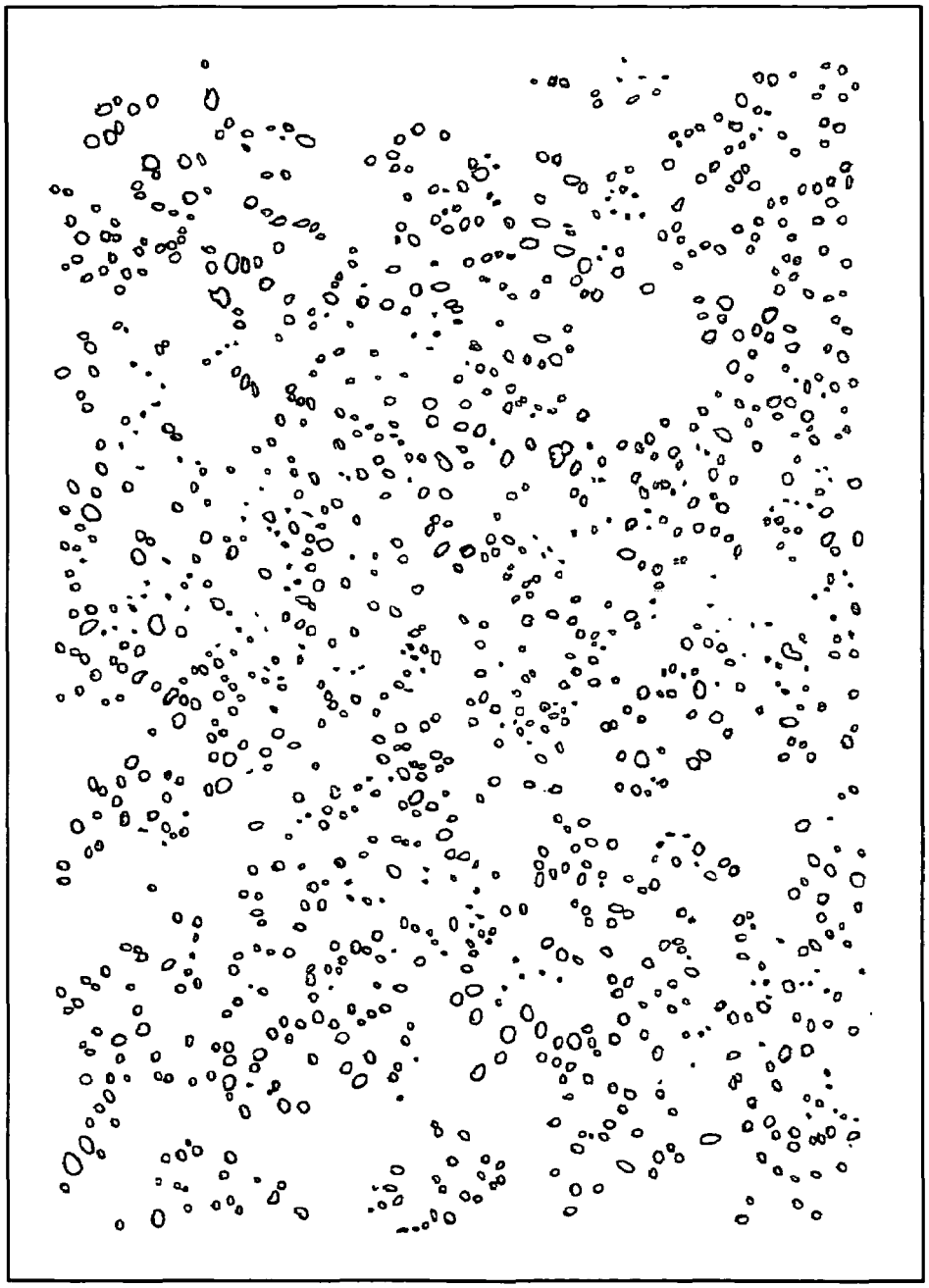
FIG. 2 depicts a graphic drawing o the Scanning Electron Micrograph (SEM) photograph of polyamide domains dispersed into polyestcr matrix according to the teachings of the specification.

The size and the distribution of the particles are reported in FIG. 2.

EXAMPLE 2

Example 1 was repeated with the only difference that the poly MXD-6 had a relative viscosity of 2.0. The cast-film had haze of 1.8%.

EXAMPLE 3

Example 2 was repeated with the only difference that PMDA was used in amount of 0.4% on COPET. The cast-film had haze of 1.9%. The SEM determination of the microstructure showded that the polyamide was dispersed in spheriform domains having an average numeral diameter al 80–100 nm; more that 80% of the particles had a diameter from 80 to 110 nm and average numeral diameter from 80 to 100 nm.

COMPARISON EXAMPLE 3

Comparison example 1 was repeated with the only difference that the COPET was not added with PMDA. The cast film had haze of 3.4%. The size of the poly MXD-6 domains was greater than 200 nm.

EXAMPLE 4

Beverage bottles of 1.5 l capacity were prepared by injection stretch blow-molding from the composition of EXAMPLE 3 and of COMPARISON EXAMPLE 1. The bottles produced from the composition of EXAMPLE 3 appeared significantly more transparent than those of COMPARISON EXAMPLE 1. The haze of bottles of EXAMPLE 3 was 2–2.5%; that of bottles of COMPARISON EXAMPLE 1 of 3.2–3.4%.

The invention claimed is:

1. A composition for preparing articles having high transparency comprising an aromatic polyester resin and a polyxylylene amide, in which the aromatic polyester resin is selected from the copolyalkylene terephthalates containing from 3 to 15% by mols of units derived from isophthalic acid and/or napthalene dicarboxylic acids and wherein the polyxylylene amide is dispersed in the aromatic polyester resin matrix as domains having an average particle size which is within the range of 30 nm to 110 nm.

2. A composition according to claim 1, in which the polyxylylene amide is poly(m-xylylene adiparnide) used in amount of 1 to 15% by weight relative to the polyester resin.

3. A composition according to claim 2 wherein the aromatic polyester resin is selected from copolyalkylene terephthalates containing from 4 to 7% by moles of units derived from isophthalic acid and/or naphthalene dicarboxylic acids.

4. A composition according to claim 3 in which the ratio of the melt viscosity of the poly(m-xylylene adipamide) to the melt viscosity of the copolyalkylene terephthalate is 1:3 to 1:8.

5. A composition according to claim 2 in which the ratio of the melt viscosity of the poly(m-xylylene adipamide) to the melt viscosity of the copolyalkylene terephthalate is 1:3 to 1:8.

6. An article having haze less than 3% obtained from the compositions according to claim 1.

7. A film or container according to claim 1, in which the polyxylylene adipamide is poly(m-xylylene adipamide).

8. A composition according to claim 1 wherein the domains have an average numeral size of 80 to 100 nm, and wherein more than 80% of the domains have a size of 80 to 110 nm.

9. A composition according to claim 8, in which the polyxylylene amide is poly(m-xylylene adipamide) used in amount of 1 to 15% by weight relative to the polyester resin.

10. A composition according to claim 9 wherein the polyester resin is selected from copolyalkylene terephthalates containing from 4 to 7% by moles of units derived from isophthalic acid and/or naphthalene dicarboxylic acids.

11. An article having haze less than 3% obtained from the compositions according to claim 8.

12. A composition according to claim 8 in which the ratio of the melt viscosity of the polyamide to the melt viscosity of the copolyalkylene terephthalate is 1:3 to 1:8.

13. A process for preparing compositions according to claim 1 in which the copolyalkylene terephthalate containing from 3 to 15% by mols of units derived from isophthalic acid and/or naphthalene dicarboxylic acids is melt-mixed with a dianhydride of a tetracarboxylic acid in amount from 0.02 to 0.4 wt% on the polyester resin and subsequently is mixed with the polyxylylene amide having melt viscosity referred to that of the polyalkylene terephthalate in a ratio of 1:3 to 1:8.

14. A composition according to claim 1 wherein the aromatic polyester resin is selected from copolyalkylene terephthalates containing from 4 to 7% by moles of units derived from isophthalic acid and/or naphthalene dicarboxylic acids.

15. A composition according to claim 1 in which the ratio of the melt viscosity of the polyxylylene amide to the melt viscosity of the copolyalkylene terephthalateis 1:3 to 1:8.

16. A composition according to claim 1 wherein the polyxylylene amide is dispersed in the aromatic polyester resin matrix as domains having an average particle size which is within the range of 30 nm to 100 nm.

17. A film or container having haze less than 3% obtained from the composition according to claim 8 and in which the polyxylylene amide is dispersed in the polyester matrix in domains having average numeral size of 80 to 100 nm, wherein more than 80% of the domains have a size of 80 to 100 nm.

18. A film or container according to claim 17, in which the polyxylylene amide is poly(m-xylylene adipamide).

19. An article according to claim 17 in which the ratio of the melt viscosity of the polyamide to the melt viscosity of the copolyalkylene terephthalate is 1:3 to 1:8.

20. A composition for preparing articles having high transparency comprising (1) a copolyalkylene terephthalates containing monomeric units that are derived from isophthalic acid and/or napthalene dicarboxylic acids and (2) a polyxylylene amide, wherein the polyxylylene amide is dispersed in the aromatic polyester resin matrix as domains having an average particle size which is within the range of 30 nm to 110 nm.

21. A composition according to claim 20, in which the polyxylylene amide is poly(m-xylylene adipamide) used in amount of 1 to 15% by weight relative to the polyester resin.

22. A composition according to claim 21 wherein the polyxylylene amide is dispersed in the aromatic polyester resin matrix as domains having an average particle size which is within the range of 30 nm to 100 mm.

23. A composition according to claim 20 wherein the polyxylylene amide is dispersed at a level within the range of 1 weight percent to 15 weight percent relative to the polyester copolyalkylene terephthalate resin.

* * * * *